(12) United States Patent
Decaens (10) Patent No.: US 8,263,925 B2
(45) Date of Patent: Sep. 11, 2012

(54) ACQUISITION CIRCUIT COMPRISING A BUFFER CAPACITOR

(75) Inventor: Gilbert Decaens, Grenoble (FR)

(73) Assignee: Societe Francaise de Detecteurs Infrarouges—Sofradir, Chatenay Malabry (FR)

( * ) Notice: Subject to any disclaimer, the term of this patent is extended or adjusted under 35 U.S.C. 154(b) by 434 days.

(21) Appl. No.: 12/697,608

(22) Filed: Feb. 1, 2010

(65) Prior Publication Data

US 2010/0193667 A1    Aug. 5, 2010

(30) Foreign Application Priority Data

Jan. 30, 2009   (FR) ........................................ 09 00395

(51) Int. Cl.
*H01J 40/14* (2006.01)

(52) U.S. Cl. .................................. 250/214 R; 250/214 A (58) Field of Classification Search .............. 250/214 R, 250/214 A, 214 SW, 208.1; 330/9, 51, 308; 327/514; 257/290–292, 440
See application file for complete search history.

(56) References Cited

U.S. PATENT DOCUMENTS

| 5,363,055 A * | 11/1994 | Ribner .............................. 330/9 |
| 2003/0011694 A1 | 1/2003 | Dierickx |
| 2007/0045514 A1 | 3/2007 | McKee et al. |
| 2008/0048100 A1 | 2/2008 | Bamji et al. |
| 2008/0079830 A1 | 4/2008 | Lepage |

* cited by examiner

*Primary Examiner* — Que T Le (74) *Attorney, Agent, or Firm* — Oliff & Berridge, PLC (57) ABSTRACT

The acquisition circuit comprises a second and third electronic switch connected in series between a photodetector and a first input terminal of an amplifier. A reference voltage is applied to a second input terminal of the amplifier, the reference voltage being applied between the photodetector and the second electronic switch by means of a fourth electronic switch. An integration capacitor and a first electronic switch are connected in parallel between the first input terminal and an output terminal of the amplifier. A buffer capacitor is connected between a common terminal of the second and third electronic switches and a secondary voltage. The electrical capacitance of the buffer capacitor is at least equal to that of the integration capacitor.

5 Claims, 10 Drawing Sheets

ACQUISITION CIRCUIT COMPRISING A BUFFER CAPACITOR

BACKGROUND OF THE INVENTION

The invention relates to an acquisition.

STATE OF THE ART

Figure 1:
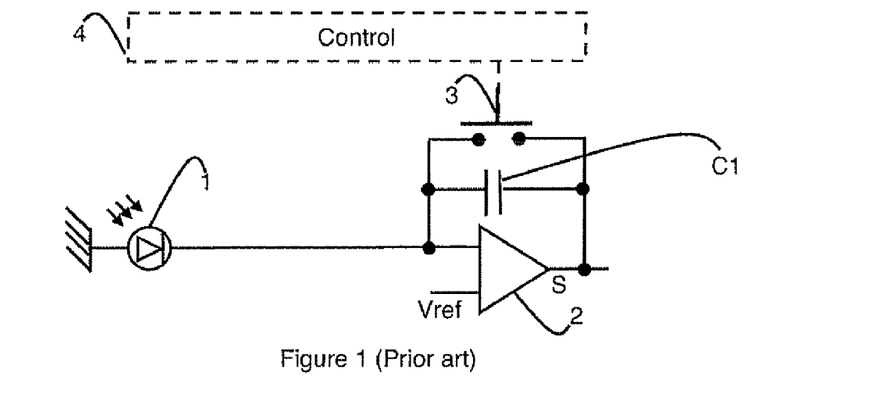
FIG. 1 represents a circuit according to the prior art in schematic manner.

In conventional manner, in the imaging system field, acquisition of a scene is achieved by a matrix of integrator pixels. As illustrated in FIG. 1, an integrator pixel comprises an acquisition circuit comprising a photodetector 1 connected to a first input terminal of an amplifier 2. A reference voltage Vref is applied to a second input terminal of amplifier 2. An integration capacitor C1 is connected between the first input terminal of amplifier 2 and an output terminal S of amplifier 2. A first electronic switch 3 is connected in parallel to the terminals of integration capacitor C1, i.e. between the first input terminal and output terminal S of amplifier 2. First electronic switch 3 is connected to a control circuit 4 which controls opening and/or closing of switch 3.

In this way, photodetector 1 delivers a current that charges integration capacitor C1, and the voltage at the terminals of capacitor C1 is subsequently used to quantify the light intensity of the scene observed by photodetector 1.

In conventional manner, first electronic switch 3 is used to zero reset the voltage at the terminals of integration capacitor C1. Thus, when the first switch is closed, the two terminals of capacitor C1 are short-circuited and capacitor C1 is initialized and operational for a new charging phase.

This simple architecture does however present numerous shortcomings. This architecture cannot be used in the active imaging systems field. In this case, photodetector 1 does in fact emit an intense current, but during a very short time, typically less than 20 ns. With this type of problematic, a large quantity of energy has to be supplied to the circuit for the latter to be able to perform data acquisition over a very short window while at the same time guaranteeing perfect measurement of the light flux emitted by the observed scene (noise, linearity).

OBJECT OF THE INVENTION

The object of the invention is to provide an acquisition circuit that is easy to implement and that enables acquisition of very short scenes with a very good measuring precision while at the same time enabling the latter to be used in an embedded device where the available energy is limited.

The circuit according to the invention is characterized by the appended claims and more particularly by the fact that it comprises:
- an amplifier comprising an input terminal and an output terminal,
- an integration capacitor and a first switch connected in parallel between the input terminal and the output terminal of the amplifier, at least two pixels connected to the input terminal, each pixel comprising:
  a photodetector,
  second and third switches connected in series between the photodetector and the input terminal of the amplifier, wherein the second and third switches have a common terminal,
  a buffer capacitor connected to said common terminal, wherein the capacitance of the buffer capacitor is at least equal to that of the integration capacitor,
  a fourth switch connected between a reference voltage source and the photodetector.

BRIEF DESCRIPTION OF THE DRAWINGS

Other advantages and features will become more clearly apparent from the following description of particular embodiments of the invention given for non-restrictive example purposes only and represented in the appended drawings, in which.

DESCRIPTION OF PREFERRED EMBODIMENTS OF THE INVENTION

Figure 2:
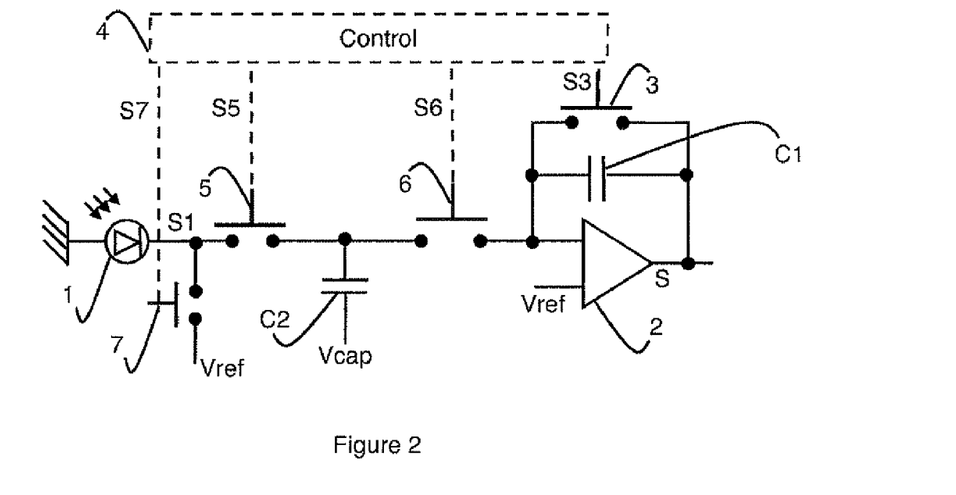
FIG. 2 represents a circuit according to the invention in schematic manner.

As illustrated in FIG. 2, the acquisition circuit comprises a photodetector 1 electrically connected to a first input terminal of an amplifier 2. A reference voltage Vref is applied to a second input terminal of amplifier 2.

An integration capacitor C1 is connected between the first input terminal of amplifier 2 and an output terminal S of amplifier 2. A first electronic switch 3 is connected in parallel to the terminals of integration capacitor C1, i.e. between the first input terminal and the output terminal of amplifier 2. Integration capacitor C1 and first electronic switch 3 are therefore connected in parallel between the first input terminal and output terminal S of amplifier 2.

Second 5 and third 6 electronic switches are connected in series between photodetector 1 and the first input terminal of amplifier 2. Thus, a first terminal of second electronic switch 5 is connected to an output terminal of photodetector 1. A second terminal of second electronic switch 5 is connected to a first input terminal of third electronic switch 6. A second terminal of third electronic switch 6 is connected to the first input terminal of amplifier 2.

A first terminal of a fourth electronic switch 7 is connected to a common terminal between photodetector 1 and second electronic switch 5. Reference voltage Vref is applied to a second terminal of fourth electronic switch 7. Reference voltage Vref is thus applied between photodetector 1 and second electronic switch 5 by means of fourth electronic switch 7. In this way, a suitable polarization is imposed at the terminals of photodetector 1 by means of fourth electronic switch 7.

For example purposes, photodetector 1 is grounded but another particular voltage could be applied to the photodetector so long as the polarization of the photodetector matches its use. Typically, the reference voltage is a positive voltage, for example equal to 1.5V.

Photodetector 1 transforms a light radiation into an electric current. It can be receptive for example to the visible range of electromagnetic radiation or to the infrared range. Photodetector 1 can be achieved by any suitable device.

A first terminal of a buffer capacitor C2 is connected to the common terminal of second 5 and third 6 electronic switches. A secondary voltage Vcap is applied to the second terminal of buffer capacitor C2. For example, in the case of an embodiment with switches having an N-type MOS transistor base and a buffer capacitor of MOS type, secondary voltage Vcap is a voltage of the same sign as reference voltage Vref and that is higher in absolute value.

Buffer capacitor C2 has an electrical capacitance that is at least equal to that of integration capacitor C1. Buffer capacitor C2 preferably has an electrical capacitance that is comprised between twice and ten times the electrical capacitance of integration capacitor C1. Advantageously, buffer capacitor C2 has an electrical capacitance that is five times greater than the electrical capacitance of integration capacitor C1.

When buffer capacitor C2 is charged by the electric current emitted by photodetector 1, a potential difference arises at the terminals of buffer capacitor C2. This potential difference causes a modification of the polarization at the terminals of photodetector 1, and the value of the electrical capacitance of capacitor C2 is therefore chosen to limit depolarization of photodetector 1. In like manner, the value of the electrical capacitance of capacitor C1 is chosen for its measurement range. The voltage at the terminals of capacitor C1 is advantageously comprised within a predefined range when photodetector 1 emits a typical charge quantity.

First 3, second 5, third 6 and fourth 7 electronic switches are connected to a control circuit 4 which controls opening and/or closing of these switches in independent manner. The control circuit emits signals S3, S5, S6 and S7 respectively associated with first 3, second 5, third 6 and fourth 7 electronic switches to command opening and closing thereof. These signals are illustrated in the chronograms of FIGS. 6, 12, 13, 14 and 15. In like manner, the current emitted by current photodetector 1 is represented schematically by a signal S1 that indicates the period during which photodetector 1 can emit a current representative of the observed scene. This signal S1 as represented is not representative of the real duration of current emission nor is it representative of the intensity delivered (FIGS. 6a, 12a, 13a, 14a and 15a).

With this acquisition circuit, the current emitted by photodetector 1 is accumulated quickly by buffer capacitor C2 which, on account of its greater electrical capacitance, is able to store all the current emitted by the photodetector during a very short period. Once charged, buffer capacitor C2 in turn charges integration capacitor C1 which presents an advantageously lower electrical capacitance and then enables a greater voltage difference to be obtained at the terminals of amplifier 2.

In a first operating mode illustrated by FIGS. 3 to 6, third 6 and fourth 7 electronic switches are in phase opposition with second electronic switch 5, which means that when second electronic switch 5 is open, third and fourth electronic switches 6 and 7 are closed and vice-versa. Furthermore, switching of first electronic switch 3 from a closed state to an open state is advantageously performed with respect to the same switching of third switch 6. The time during which first electronic switch 3 is in the on state must necessarily be sufficient to perform re-initialization of capacitor C1 The purpose of first electronic switch 3 being to initialize capacitor C2, switching thereof from a closed state to an open state can be independent from that of the other electronic switches.

Figure 3:
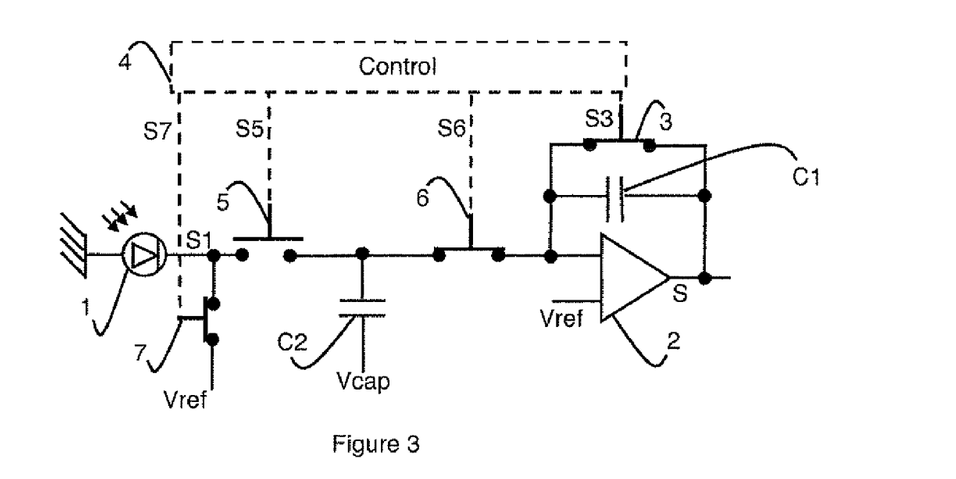
FIGS. 3, 4 and 5 schematically represent a first mode of operation of a circuit according to the invention at different data acquisition periods.
Figure 4:
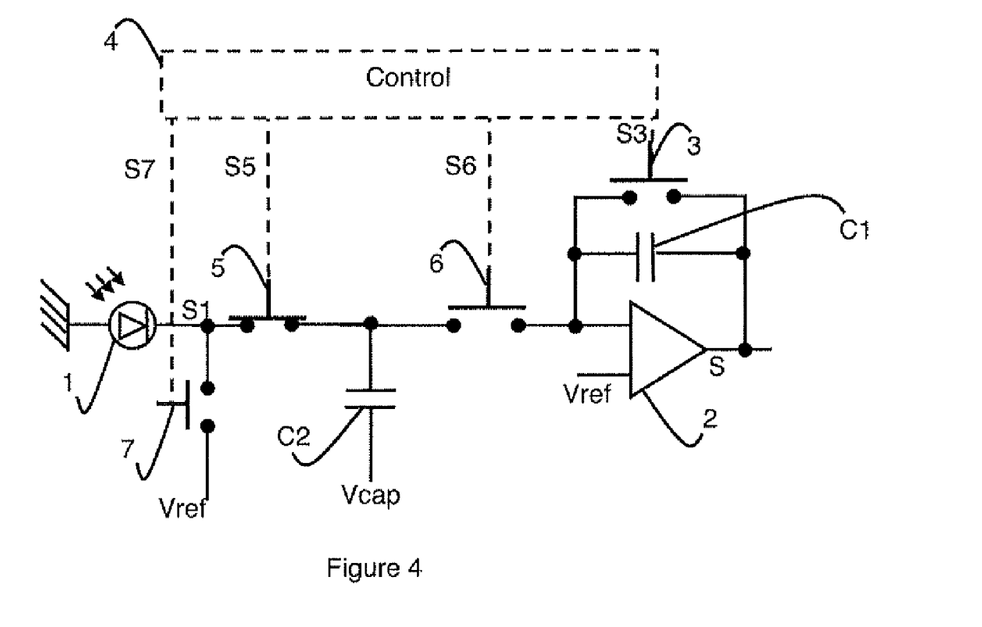
Figure 5:
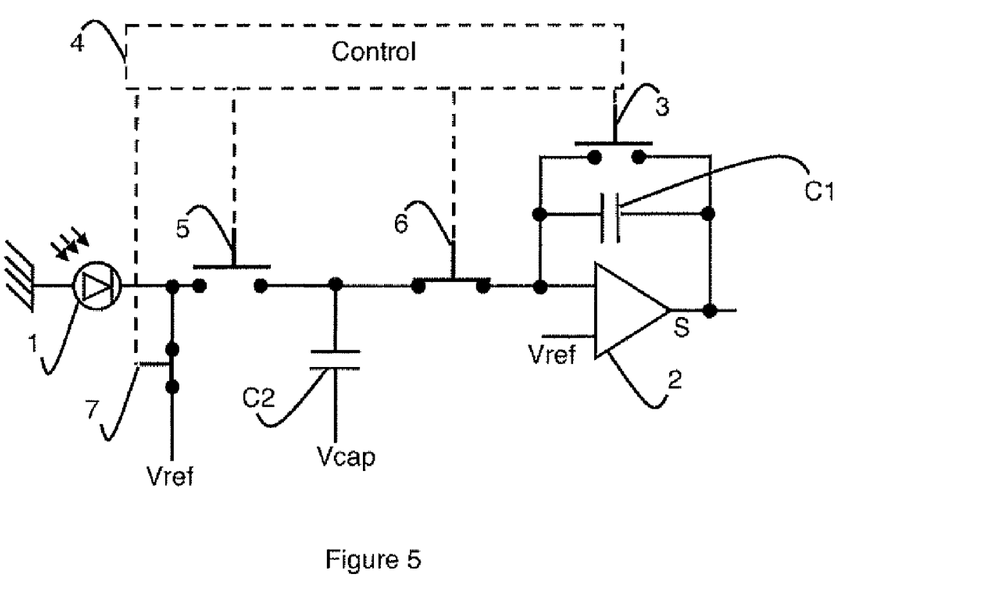

FIGS. 3 to 5 illustrate the different processing steps when acquisition of a scene is performed by the photodetector. FIG. 6 represent chronograms of opening and closing of the different electronic switches of the circuit and of emission of the photodetector. Level 1 represents a closed switch that is therefore on whereas level 0 represents an open switch that is therefore off.

As illustrated in FIGS. 3 and 6, in a first period A, between times $t_0$ and $t_1$, first 3, third 6 and fourth 7 electronic switches are closed (FIGS. 6d, 6e and 6b) and therefore allow a current to flow, and second electronic switch 5 is open and therefore does not let any current flow. Second switch 5 being open, no current is flowing from photodetector 1 to buffer capacitor C2 and integration capacitor C1. During this phase, integration capacitor C1 and buffer capacitor C2 are initialized.

Figure 6A:
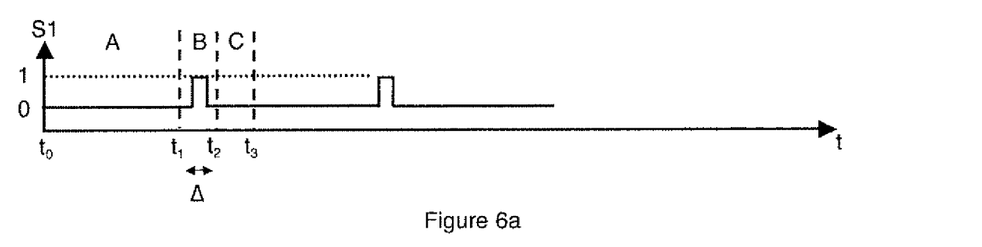
FIGS. 6a-6e represent chronograms of the signals representative of openings and closings of the different electronic switches and of current emission by the photodetector corresponding to FIGS. 3 to 5, according to the invention, FIGS. 7, 8, 9 and 10 schematically represent a second mode of operation of a circuit according to the invention at different data acquisition periods, FIG. 11 schematically represents a third mode of operation of a circuit according to the invention.
Figure 6B:
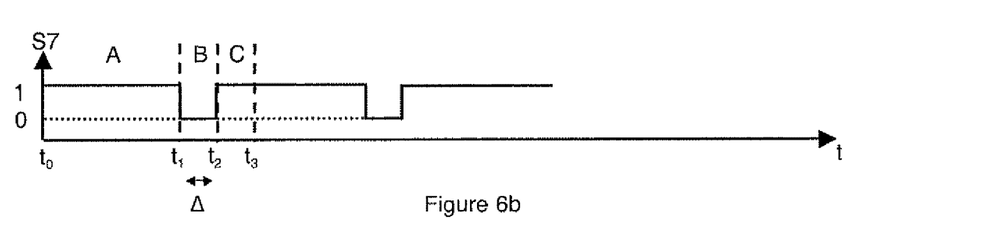
Figure 6C:
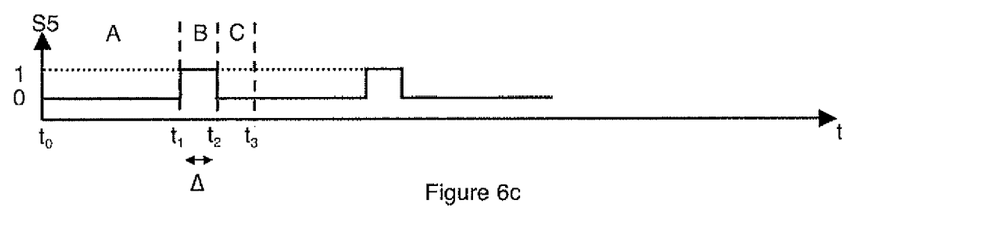
Figure 6D:
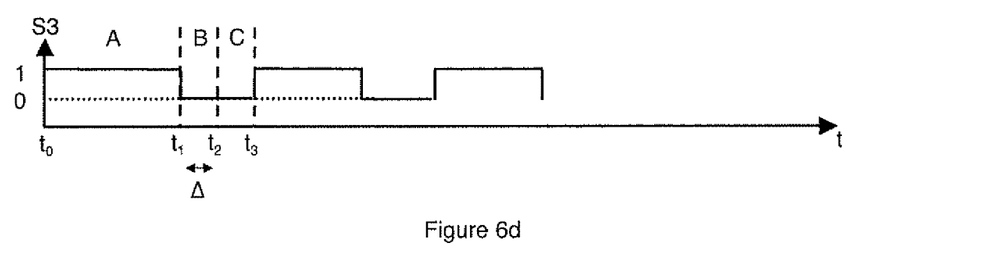
Figure 6E:
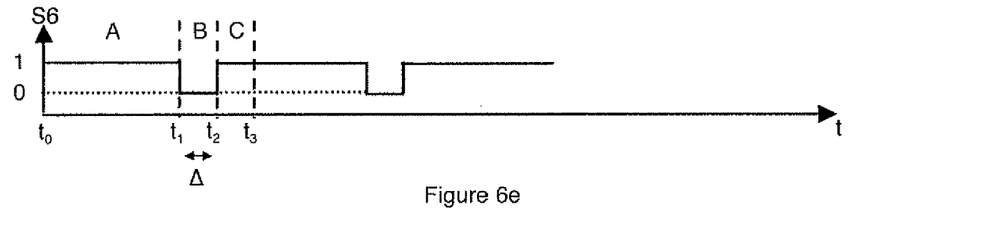

As illustrated in FIGS. 4 and 6, in a second period B, between times $t_1$ and $t_2$, the states of all the electronic switches are reversed, first 3, third 6 and fourth 7 electronic switches are kept open and therefore off, and second electronic switch 5 is kept closed and therefore on (FIG. 6c). During this second period B, during a very short time period A, photodetector 1 delivers an intense current representative of the observed scene (FIG. 6a). Second switch 5 being closed, a current then flows from photodetector 1 to buffer capacitor C2 which charges.

In an alternative embodiment, third switch 6 can remain in the closed state, and photodetector 1 then also charges integration capacitor C1 directly or via buffer capacitor C2. The electric charges accumulated in buffer capacitor C2 can in fact flow to integration capacitor C1 which charges in turn. Typically, the period between $t_1$ and $t_2$ is less than a microsecond and more particularly comprised between 50 and 100 ns, and the period during which photodetector 1 delivers a current is less than or equal to 20 ns. During this short period, photodetector 1 delivers a current the intensity of which is about a few microamps. Second electronic switch 5 and fourth electronic switch 7 are therefore respectively simultaneously closed and open, typically during a period of less than a microsecond and more particularly during a period comprised between 50 and 100 ns.

As illustrated in FIGS. 5 and 6, at time $t_2$ and up to a time $t_3$ representing the end of third period C, third electronic switch 6 switches from an off state to an on state. This change of state of switch 6 enables the charges of capacitor C2 to migrate to capacitor C1. Once the charge transfer has taken place from capacitor C2 to capacitor C1, the voltage at the terminals of integration capacitor C1 can be measured by amplifier 2. Measurement of the voltage at the terminals of integration capacitor C1 is performed at the end of third period C.

At time $t_3$, first electronic switch 3 changes state to revert to the state defined in period A and illustrated in FIG. 3 which results in a short-circuit occurring at the terminals of capacitor C1.

Figure 9:
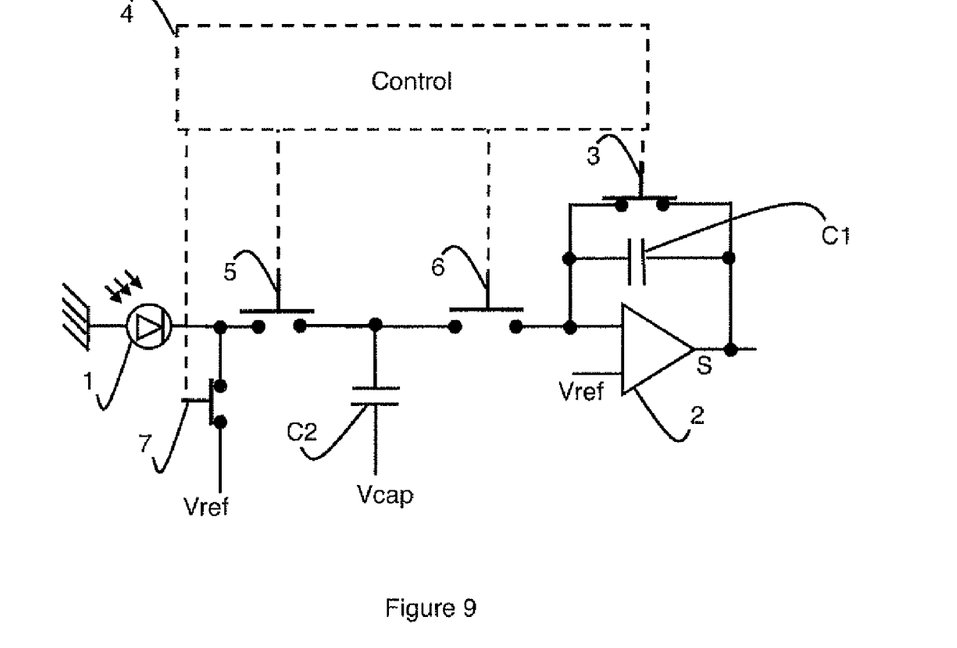
Figure 10:
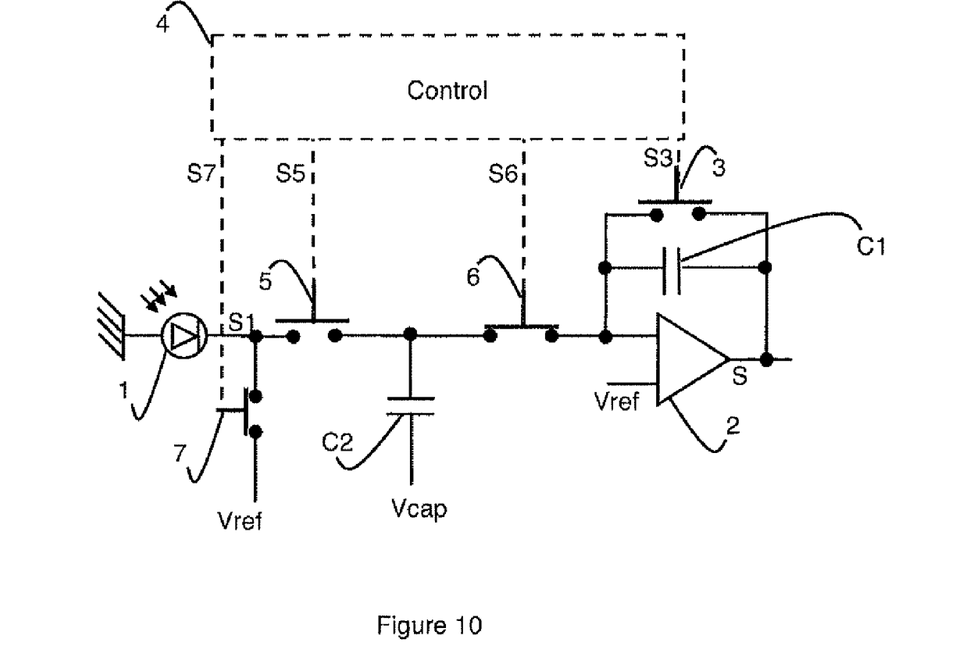
Figure 11:
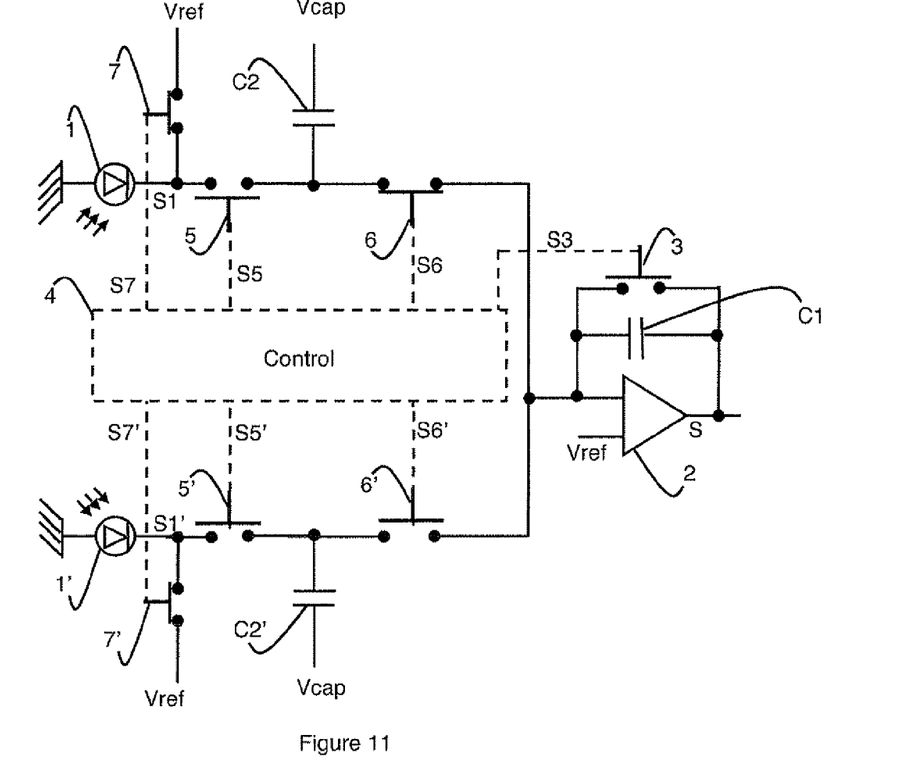

In another operating mode illustrated in FIGS. 7 to 10 and in FIG. 11, in periods A to D, the opening and closing phases of fourth electronic switch 7 enable capacitor C1, first electronic switch 3 and amplifier 2 to be pooled for a plurality of pixels. In this way, these above-mentioned three elements can be associated with several photodetectors 1 which are themselves associated with their own second 5, third 6 and fourth 7 electronic switches and with their own buffer capacitor C2.

Figure 7:
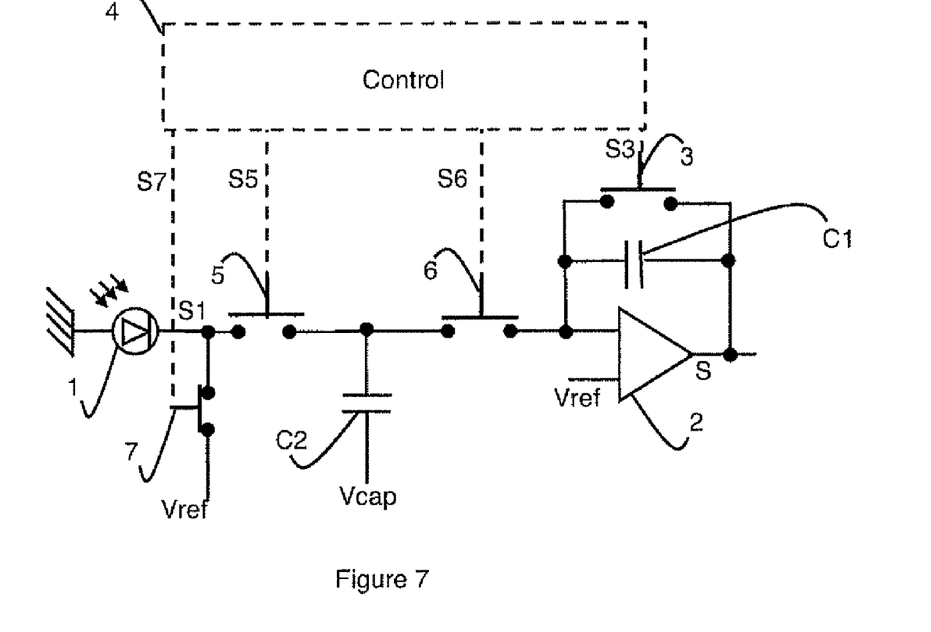

As illustrated in FIGS. 7 and 12, in a first period A, between times $t_0$ and $t_1$, first 3, second 5 and third 6 electronic switches are open and do not let the current flow. Fourth 7 electronic switch is closed and therefore allows a current to flow. During this first phase, the photodetector is polarized and is ready to operate, and capacitor C2 is connected neither to photodetector 1 nor to integration capacitor C1. No current is flowing from photodetector 1 to buffer capacitor C2 and integration capacitor C1.

Figure 8:
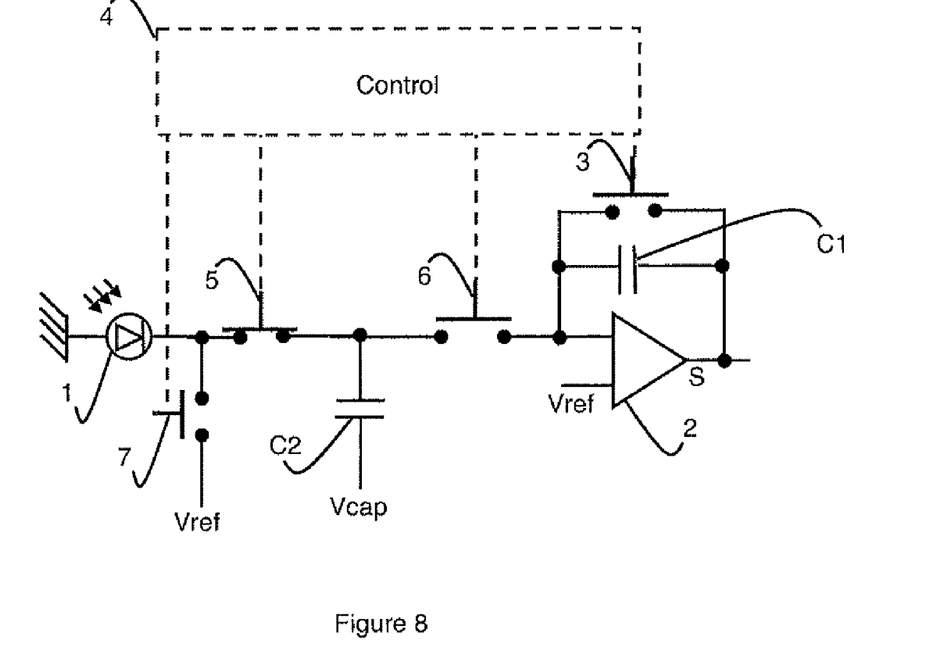

As illustrated in FIGS. 8 and 12, in a second period B between times $t_1$ and $t_2$, the states of second 5 and fourth 7 electronic switches are reversed, fourth electronic switch 7 is kept open and therefore off, and second electronic switch 5 is kept closed and therefore on. During this second period B, during a very short time period Δ, photodetector 1 delivers an intense current representative of the observed scene. Second switch 5 being closed, a current then flows from photodetector 1 to buffer capacitor C2 which charges. The states of first 3 and third 6 switches are unchanged. The period during which second switch 5 is closed and fourth switch 7 is open determines the storage period of the current emitted by photodetector 1 in buffer capacitor C2.

As illustrated in FIGS. 9 and 12, at time $t_2$ and up to a time $t_3$ representing the end of third period C, the states of second 5 and fourth 7 electronic switches is again reversed, second 5 and fourth 7 electronic switches now becoming respectively open and closed again. Buffer capacitor C2 is no longer connected to photodetector 1 and is no longer connected to capacitor C1. During this period, the quantity of charge emitted by the photodetector during the previous phase B is stored in capacitor C2. It is also possible for first electronic switch 3 to change state shortly after time $t_2$ or at $t_2$. During this phase, reinitialization of integration capacitor C1 takes place.

As illustrated in FIGS. 10 and 12, at time $t_3$ representing the beginning of a fourth period D, third electronic switch 6 switches from an off state to an on state. This change of state of switch 6 enables the charges to migrate from capacitor C2 to capacitor C1. Once transfer of the charges has taken place from capacitor C2 to capacitor C1, the voltage at the terminals of integration capacitor C1 can be measured on the output terminal of amplifier 2. Measurement of the voltage at the terminals of integration capacitor C1 is performed at the end of fourth period D. It is also possible for third switch 6 to switch from off state to one state at time $t_3$ or just after.

This operating mode is particularly advantageous as the acquisition phase of the charges by buffer capacitor C2 from the photodetector is decorrelated from the counting phase of these charges, or integration phase, by means of amplifier 2 which measures the potential difference representative of these charges at the terminals of capacitor C1.

An embodiment comprising pooling of amplifier 2, integration capacitor C1 and first electronic switch 3 is illustrated in FIG. 11. Amplifier 2 is connected to two pixels both of which comprise a buffer capacitor C2 and C2' and second 5 and 5', third 6 and 6', and fourth 7 and 7' electronic switches. Control circuit 4 is then connected to the electronic switches of each of the pixels and to first electronic switch 3. A first pixel is thus formed by photodetector 1, buffer capacitor C2, and second 5, third 6 and fourth 7 electronic switches and an additional pixel is formed in the same way by elements 1', C2', 5', 6' and 7'.

In the case of pooling of the amplifier, the plurality of pixels simultaneously performs acquisition of the observed scene during a very short period by means of buffer capacitors C2 and C2'. During periods A and B, electronic switches 5 and 5' and 7 and 7' have identical switchings which are represented by the same signals respectively noted S5 and S7 in FIGS. 12c and 12b. During the rest of the acquisition period, between time $t_2$ and a new time $t_0$, the charges are successively displaced from each capacitor C2 onto integration capacitor C1 which then performs a measurement for each pixel, i.e. for each quantity of charge stored by capacitor C2.

Between times $t_2$ and $t_3$, i.e. during period C, initialization of capacitor C1 takes place. Between times $t_3$ and $t_4$, i.e. during period D, transfer of the charges from buffer capacitor C2 to integration capacitor C1 takes place to enable the charges integrated in the first pixel to be measured. Between times $t_2$ and $t_4$, the additional pixel does not change state and buffer capacitor C2' is advantageously disconnected from photodetector 1' and from amplifier 2. Between times $t_2$ and $t_4$, third electronic switch 6' is in an off state and second electronic switch 5' is advantageously in the off state.

Between times $t_4$ and $t_5$, i.e. during period C', initialization of capacitor C1 takes place to eliminate the charges emanating from capacitor C2. Between times $t_5$ and $t_6$, i.e. during period D', transfer of the charges from buffer capacitor C2' to integration capacitor C1 takes place to enable the charges integrated in the additional pixel to be measured. As before, to prevent any disturbance charge phenomenon of buffer capacitor C2 outside its charge period or its electric charge transfer period, third electronic switch 6 is in an off state and second electronic switch 5 is advantageously in the off state between times $t_4$ and $t_6$.

In the embodiment illustrated in FIG. 11, only two pixels are represented, but it is possible to pool amplifier 2 and its associated elements for a larger number of pixels.

The connection between amplifier 2 and the pixels can be achieved for example by means of third switch 6 or by means of additional switches which enable amplifier 2 to be connected independently to one of the multiple pixels.

During acquisition, we then have a succession of phases C and D where each couple of phases C and D is associated with a pixel and therefore with a capacitor C2. We naturally have a reinitialization of capacitor C1 between two measurements of the charges of a capacitor C2.

As illustrated in FIGS. 13 to 15, it is also possible to stagger switching of the different switches between one another to make operation more robust or to take account of possible delays in switching of the switches. In a general manner, time $t_1$ corresponds to switching of fourth transistor 7 from an on state to an off state. Time $t_2$ corresponds to switching of second electronic switch 5 from an on state to an off state. Time $t_3$ corresponds to switching of first transistor 3 from an on state to an off state. Time $t_4$ corresponds to switching of third transistor 6 from an on state to an off state. However, during period Δ, second 5 and fourth switch 7 have to be in opposite states.

As illustrated in FIG. 13, fourth electronic switch 7 can switch from the off state to the on state after time $t_2$ but before time $t_3$. Switching of second switch 5 from the off state to the on state can also take place before time $t_1$. In a general manner, switching of electronic switch 7 has to be performed between times $t_2$ and $t_4$ but always before a new time $t_1$ to have a polarized photodetector 1 for period Δ.

Figure 14A:
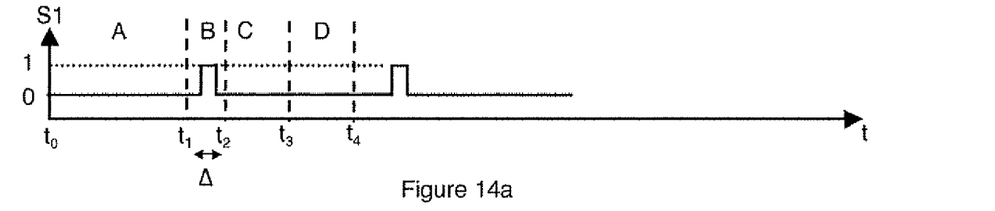
Figure 14B:
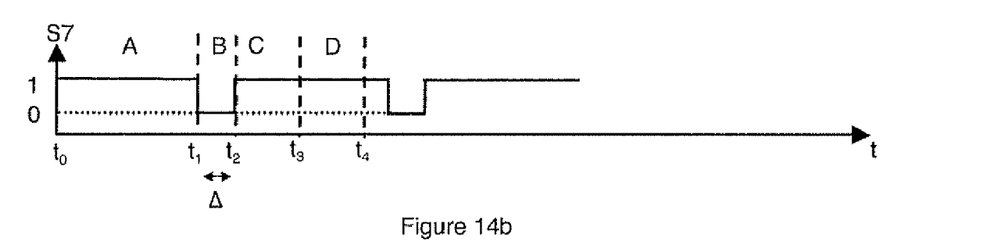
Figure 14C:
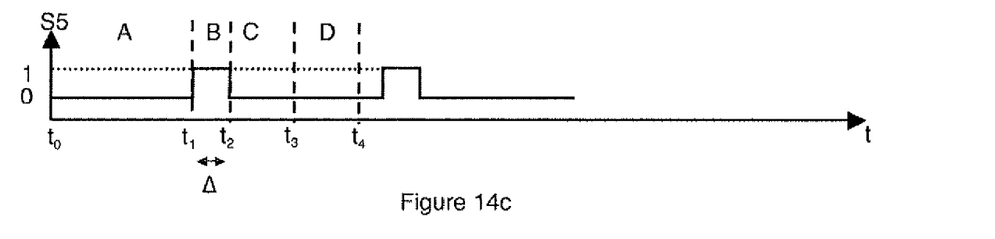
Figure 14D:
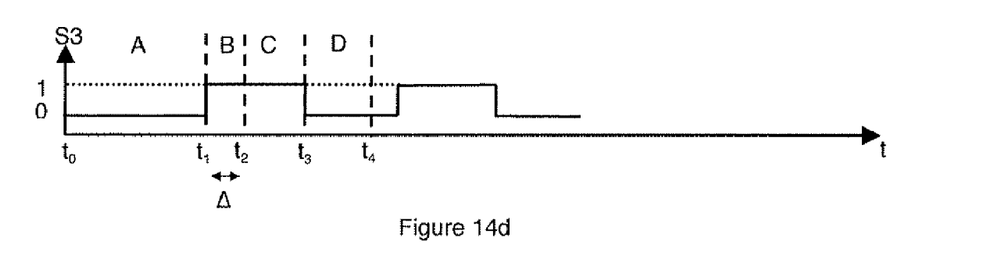
Figure 14E:
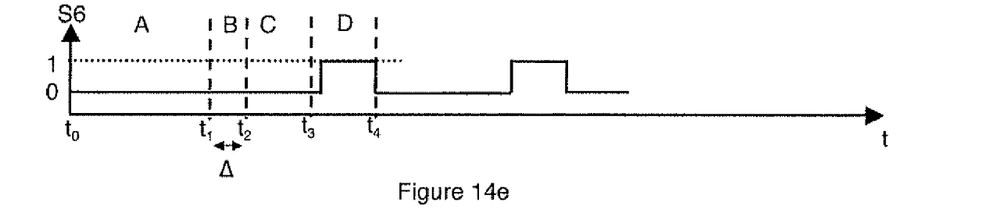
Figure 15A:
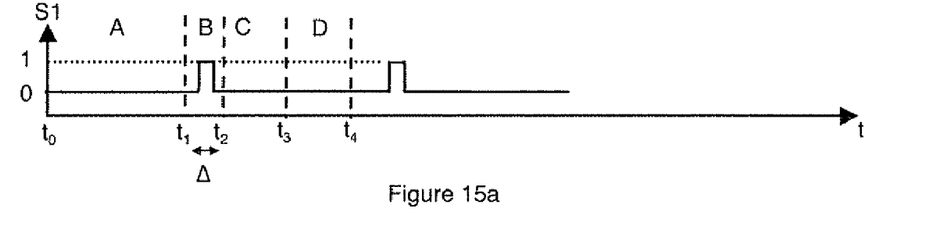
Figure 15B:
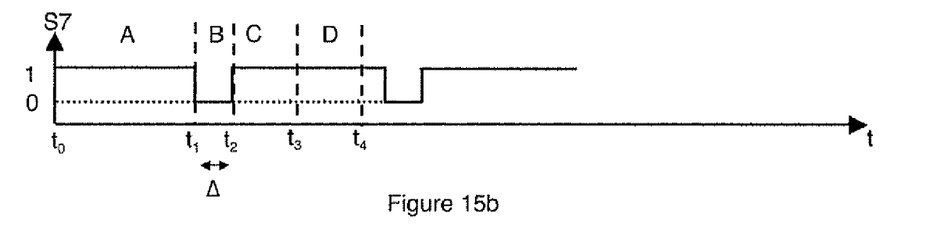
Figure 15C:
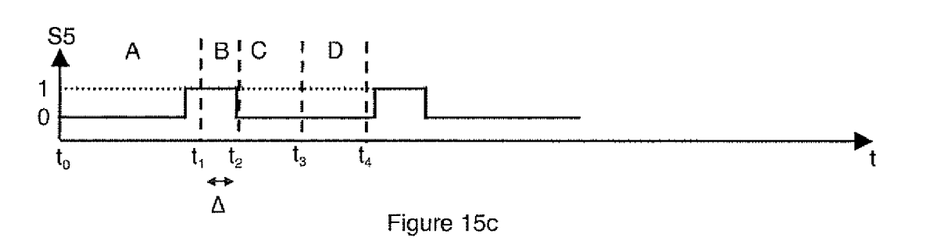
Figure 15D:
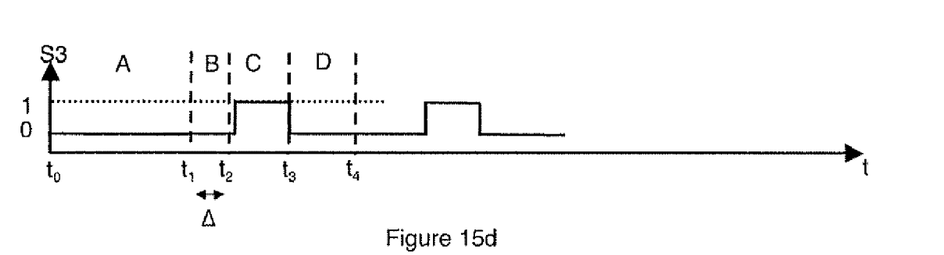
Figure 15E:
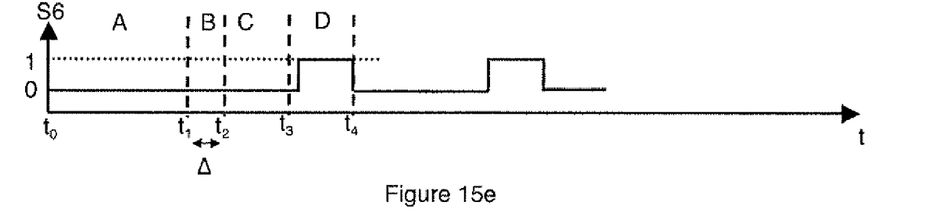

As illustrated in FIG. 14 and particularly in FIG. 14d, first electronic switch 3 can switch from the off state to the on state before time $t_2$ and more precisely at time $t_1$.

Figure 12A:
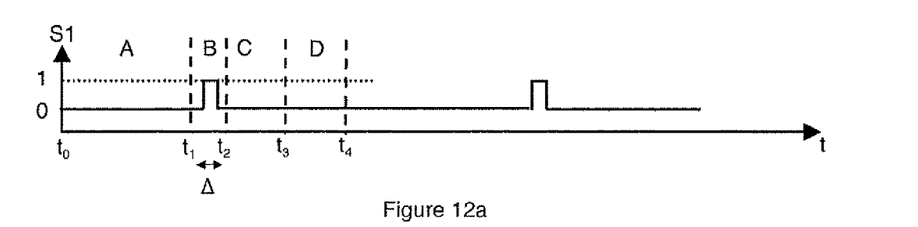
FIGS. 12a-12g represent chronograms of the signals representative of openings and closings of the different electronic switches and of current emission by the photodetector corresponding to FIG. 11, according to the invention.
Figure 12B:
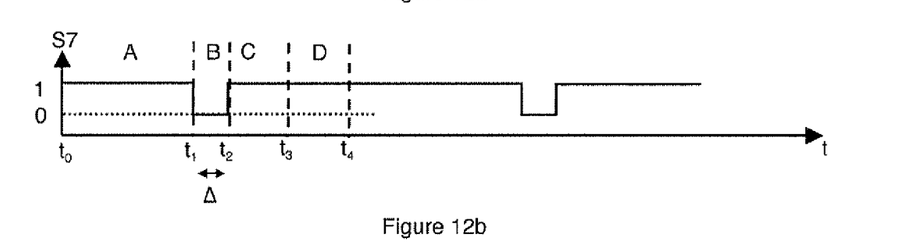
Figure 12C:
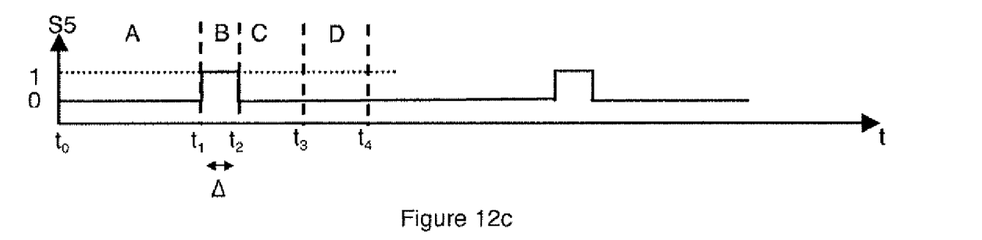
Figure 12D:
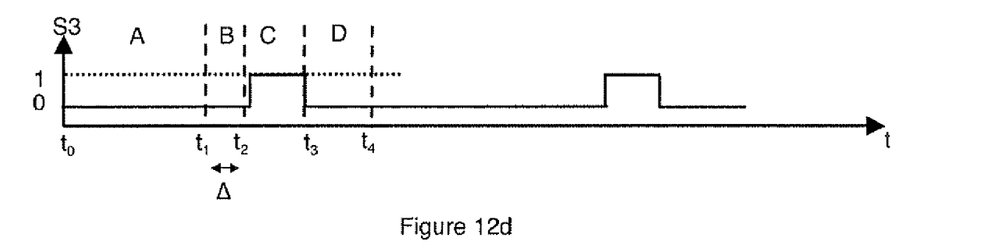
Figure 12E:
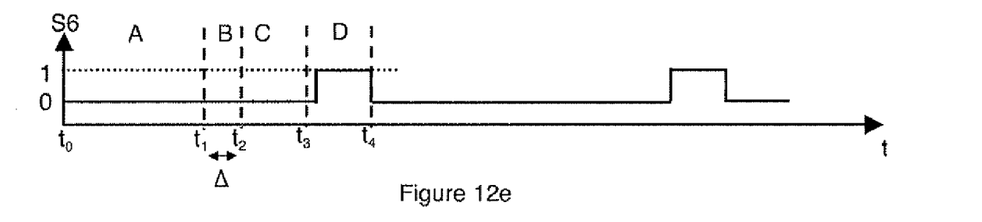
Figure 12F:
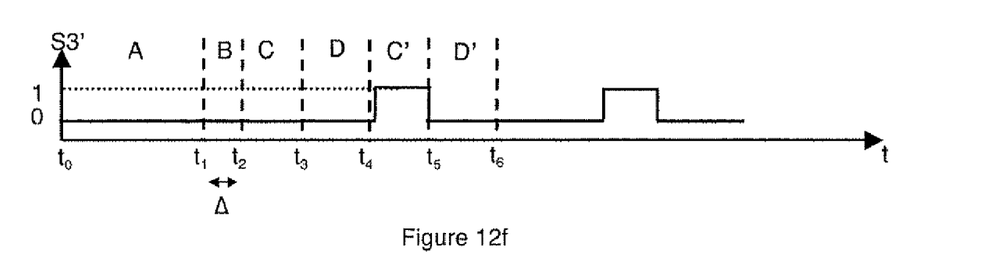
Figure 12G:
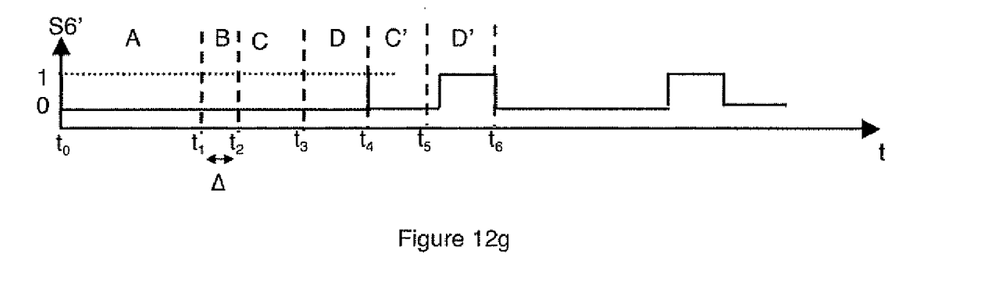
Figure 13A:
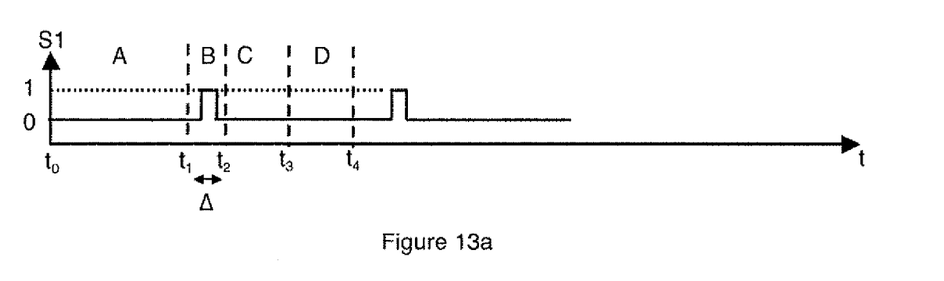
FIGS. 13a-13e represent chronograms of the signals representative of openings and closings of the different electronic switches and of current emission by the photodetector of a third mode of operation of a circuit according to FIG. 2, FIGS. 14a-14e and 15a-15e represent chronograms of the signals representative of openings and closings of the different electronic switches and of current emission by the photodetector respectively of a fourth and a fifth modes of operation of the circuit illustrated in FIG. 2.
Figure 13B:
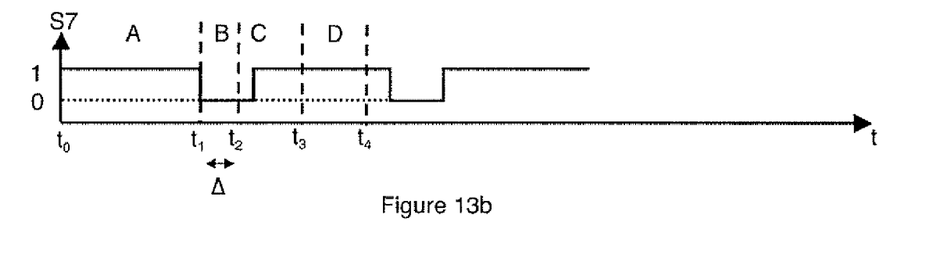
Figure 13C:
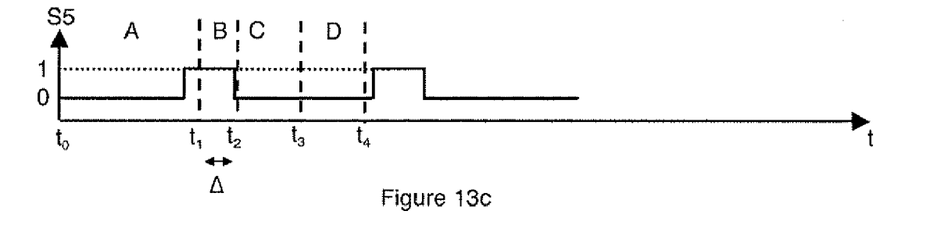
Figure 13D:
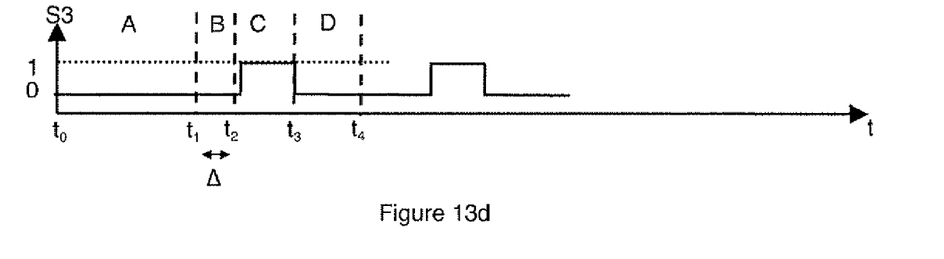
Figure 13E:
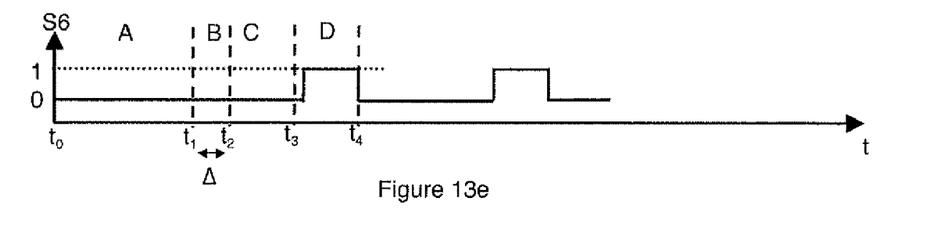

As illustrated in FIGS. 15a to 15e, in a new operating mode, the openings/closings of second electronic switch 5 of FIG. 13c can be combined with those of FIGS. 12a, b, d and e for the other electronic switches. In a general manner, switching from the off state to the on state has to take place before $t_1$ for second electronic switch 5.

Integration capacitor C1 is substantially identical to the one used in the prior art. It presents a low electrical capacitance so as to enable a good measurement of the delivered current by supplying a high voltage on its terminals.

The use of an additional buffer capacitor enables the general performances of the circuit to be preserved, in particular in terms of linearity and noise as the characteristics of integration capacitor C1 have been preserved. Furthermore, by means of buffer capacitor C2, which is a passive component, and by means of third electronic switch 6 and fourth electronic switch 7, it is not necessary to supply a large quantity of energy to the circuit and especially to amplifier 2 to manage a large and brief current flux emanating from the photodetector in the circuit.

The acquisition frequency of the circuit is unchanged. Although photodetector only delivers a current during a short duration of the acquisition period, the rest of this period is used to transfer the electric charges from buffer capacitor C2 to integration capacitor C1 and to measure the potential difference at the terminals of capacitor C1.

Fourth electronic switch 7 must never switch from off state to on state before second switch 5 has switched from on state to off state to prevent any loss of electric charge.

Although this circuit is particularly advantageous for a use of active type, i.e. when the photodetector emits an intense signal during a very short period, this circuit can also be used for passive applications in which the photodetector emits a weak current during a long period, typically several milliseconds.

The invention claimed is:

1. An acquisition circuit comprising:
   an amplifier comprising an input terminal and an output terminal,
   an integration capacitor and a first switch connected in parallel between the input terminal and the output terminal of the amplifier,
   at least two pixels connected to the input terminal, each pixel comprising:
   a photodetector,
   second and third switches connected in series between the photodetector and the input terminal of the amplifier, wherein the second and third switches have a common terminal,
   a buffer capacitor connected to said common terminal, wherein the capacitance of the buffer capacitor is at least equal to that of the integration capacitor,
   a fourth switch connected between a reference voltage source and the photodetector.

2. The circuit according to claim 1, wherein the capacitance of the buffer capacitor is comprised between twice and ten times the capacitance of the integration capacitor.

3. A method for using the device according to claim 1, wherein during an emission period of a current by the photodetector, a control circuit commanding opening and closing of the switches emits a closing signal of the second switches and an opening signal of the fourth switches.

4. The method according to claim 3, wherein the time during which the second switches are closed and the fourth switches are simultaneously open is less than a microsecond.

5. The method according to claim 4, wherein the time during which the second switches are closed and the fourth switches are simultaneously open is comprised between 50 and 100 ns.

* * * * *